United States Patent
Baron et al.

(10) Patent No.: US 6,288,862 B1
(45) Date of Patent: Sep. 11, 2001

(54) METHOD AND MECHANISM TO DISTINGUISH VALID FROM OUTDATED RECORDING BLOCKS IN A TAPE DRIVE

(75) Inventors: Benjamin Joseph Baron, Boulder; Richard A. Gill, Arvada; James Wolf, Loveland, all of CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/364,496

(22) Filed: Jul. 30, 1999

(51) Int. Cl.$^7$ ........................................................ G11B 5/09
(52) U.S. Cl. .................................. 360/55; 360/48; 360/53
(58) Field of Search .................................. 360/40, 48, 49, 360/54, 53, 55

(56) References Cited

U.S. PATENT DOCUMENTS

| | | |
|---|---|---|
| 4,559,568 | 12/1985 | Watanabe et al. . |
| 5,363,264 * | 11/1994 | Cavanaugh et al. ................. 386/110 |
| 5,452,284 * | 9/1995 | Miyagawa et al. ............... 369/44.28 |
| 5,485,321 | 1/1996 | Leonhardt et al. . |
| 5,619,384 | 4/1997 | Leonhardt et al. . |
| 5,719,717 | 2/1998 | Leonhardt et al. . |
| 5,774,287 | 6/1998 | Leonhardt et al. . |
| 6,031,671 * | 2/2000 | Ayres ................................. 360/77.12 |

FOREIGN PATENT DOCUMENTS

| | | |
|---|---|---|
| 0 558 169 | 9/1993 | (EP) . |
| 0 936 618 | 8/1999 | (EP) . |
| 60 122426 | 6/1985 | (JP) . |
| 97 27545 | 7/1997 | (WO) . |

* cited by examiner

*Primary Examiner*—Regina Y. Neal
(74) *Attorney, Agent, or Firm*—Brooks & Kushman P.C.

(57) ABSTRACT

A method and a mechanism enabling the method are described to aid in distinguishing new information from old information on a medium. A new variable called a Master Write Pass Count is created for the medium. The Master Write Pass Count is initialized once, advanced on each occasion that new information is written in the medium, and it is never reinitialized or regressed. During each write session the Master Write Pass Count is copied into a Write Pass Count variable associated with each block receiving the new information. The Write Pass Counts may be stored in the header or trailer of the associated block, or external to the block. When the blocks are read from the medium, the Write Pass Counts may be used alone, or in combination with other information associated with the blocks, such as a block identification number, to aid in distinguishing new information from old information.

2 Claims, 6 Drawing Sheets

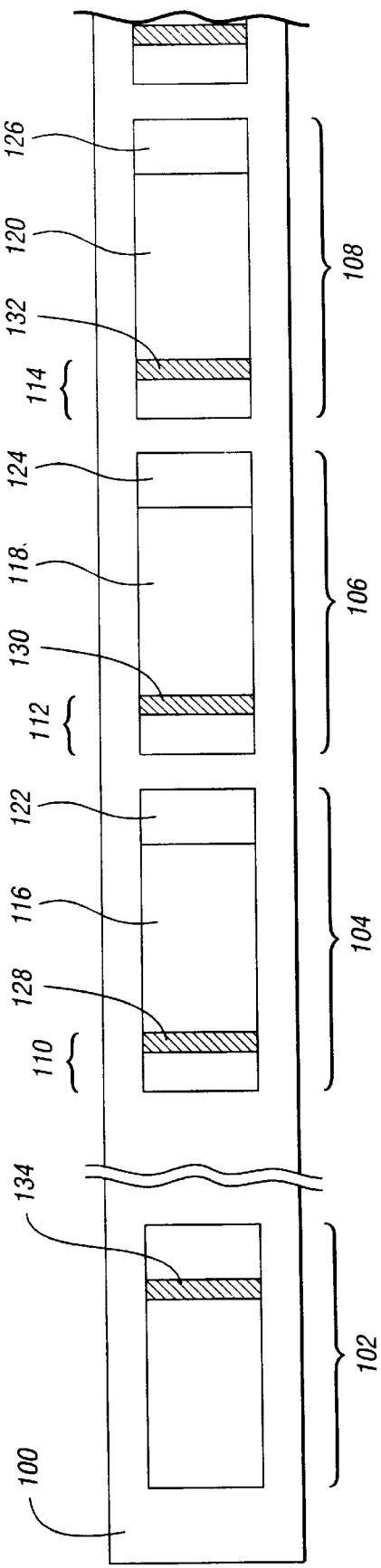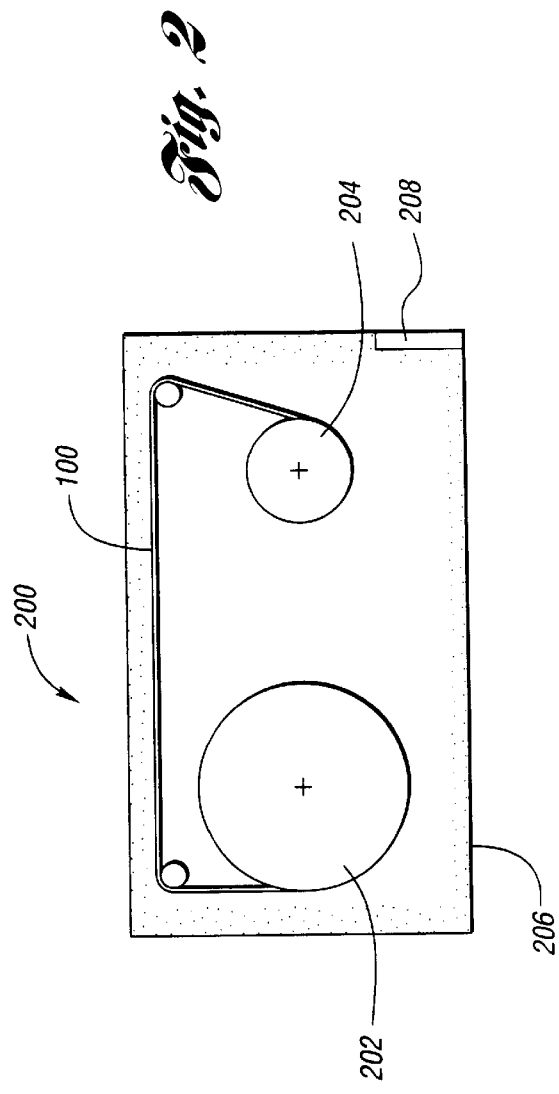

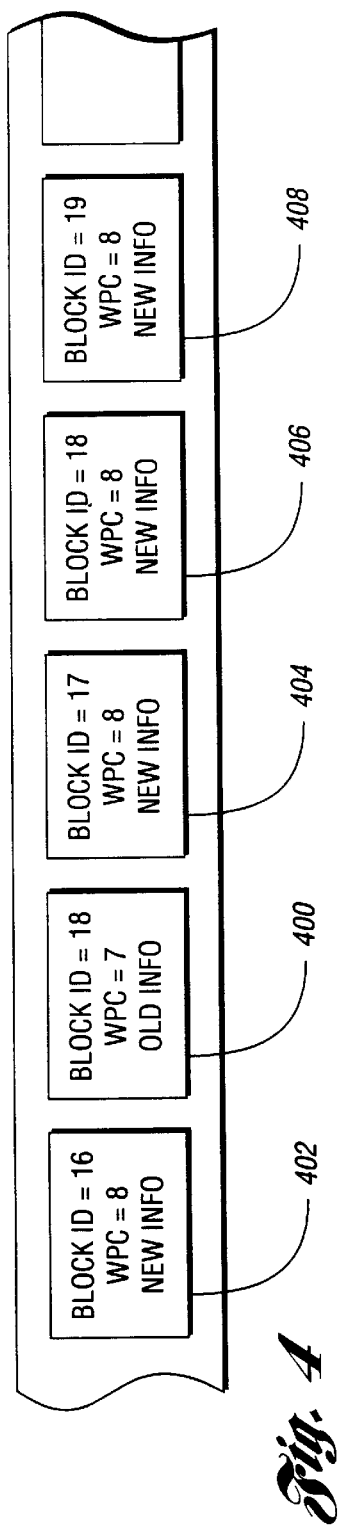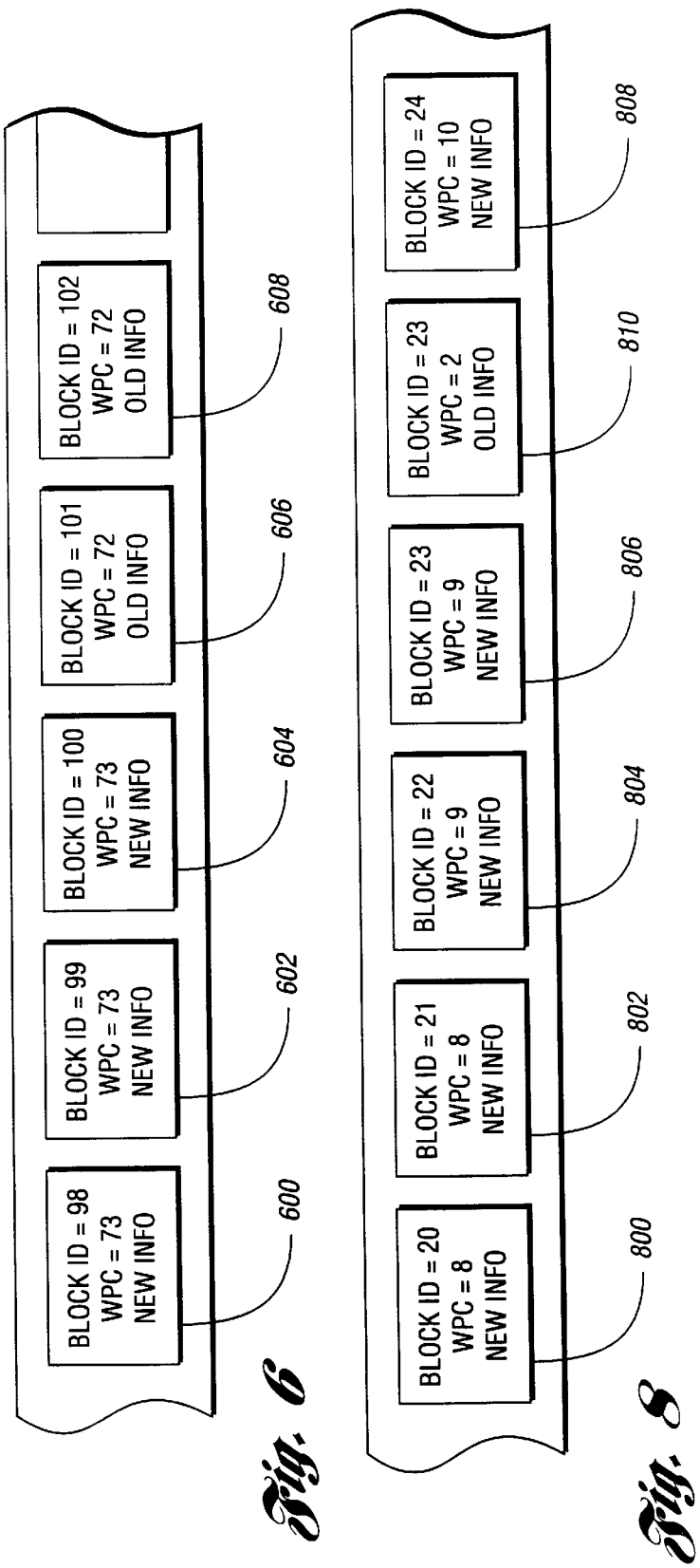

METHOD AND MECHANISM TO DISTINGUISH VALID FROM OUTDATED RECORDING BLOCKS IN A TAPE DRIVE

TECHNICAL FIELD

The present invention relates to methods of distinguishing new information from old information in a medium, and mechanisms that support the methods.

BACKGROUND ART

Mass storage media commonly stores information in sequential recording blocks starting from a loading or initial position and proceeding always in one logical direction. A recording block is the smallest unit that can be written and retrieved from the medium. Recording blocks include, but are not limited to control blocks, data blocks and device blocks. A well known example of mass storage is a magnetic tape used in a streaming tape backup application where the entire image of a hard drive is copied onto the tape. The tape is usually loaded starting at one physical end of the tape. Information is then written in the tape in sequential recording blocks as the tape streams toward its far physical end. In some situations an individual tape may be written on once and then archived indefinitely. Tapes in other situations are reused periodically with the new information being written directly over the old information.

It is well known in the art that the storing of additional information along with the customer's information can be helpful in managing the use of tapes and other media. For example, U.S. Pat. No. 5,485,321 issued to Leonhardt et al., on Jan. 16, 1996 discloses identifiers for the user (customer), system and subsystems, application specifications, physical motion data, and header chronology information stored in a user header accompanying a data record. U.S. Pat. 5,619,384 issued to Leonhardt et al., on Apr. 8, 1997 discloses additional header information including block identification (ID), recording block recovery means indicators, recording block length, sequence numbers within recording block groups and block group ID.

Data about the history of the information stored in the recording blocks is traditionally maintained at the file or volume level where it is applied to large groups of recording blocks, instead of at the individual recording block level in each header. File and volume time information usually identifies when the file/volume was created and when it was modified last. Revision information is often maintained within the file/volume, or is embedded in a file/volume name. In any case, the history is applied to all recording blocks equally. There is no mechanism to identify when the history of any one recording block is out of sync with the history of the surrounding files. This creates problems when reading the information from the medium because old information accidently left in the medium may be output during a read process.

DISCLOSURE OF INVENTION

The invention is a method and mechanism for distinguishing new recording blocks from old recording blocks that are adjacent or intermixed in a medium. The method uses a sequence counter or time stamp, called a Write Pass Count, associated with each recording block within a data volume (a medium and housing) to provide a unique identifier for each occurrence that new information is written into the medium. The Write Pass Count is advanced prior to the start of each write session. During the write session, the Write Pass Count is copied into the header, trailer or some other area where it is associated with each recording block receiving the new information. A Master Write Pass Count for the data volume is maintained on the medium, or in a nonvolatile memory mounted within the housing, if any. (The region in the medium that stores the Master Write Pass Count is called a media information region. The media information region contains data concerning the medium such as media type, history, defect location, indexing, administrative, and other useful information. It is usually found at the logical start of the medium. The media information region is maintained independent of the customer information and is not erased when the customer information is erased.) The Master Write Pass Count is set to an initial value when the data volume is first fabricated and it is never reset. An advantage of this invention is that the Master Write Pass Count and individual Write Pass Counts can be added to existing data volumes without changing the recording format or adding a new physical mechanism to the data volumes.

Write Pass Counts read from the medium can be used in several ways to aid in distinguishing new recording blocks from old recording blocks. In situations where two or more recording blocks have the same recording block identification, the Write Pass Counts associated with the recording blocks can be used to determine the order in which the recording blocks were written. The newest recording block will have the highest Write Pass Count, the oldest recording block will have the lowest Write Pass Count. Where all of the new recording blocks have been written in one write session, all of the new recording blocks are easily identified because they all have the same Write Pass Count. Where the new recording blocks were stored in the medium in multiple write sessions, the Write Pass Counts of the recording blocks will always advance as the recording blocks are read from the first to the last write session of the multiple write sessions. Any recording block having a Write Pass Count that regresses may be rejected as an old recording block that was not properly erased, or is beyond the logical erasure zone.

Accordingly, it is an object of the present invention to provide a method of distinguishing new recording blocks from old recording blocks stored in a medium where the new recording blocks and old recording blocks have the same recording block identifications.

Another object of the present invention is to provide a method for distinguishing new recording blocks from old recording blocks stored in a medium where the new recording blocks are written over the old recording blocks but do not completely erase all of the old recording blocks.

Yet another object of the present invention is to provide a mechanism within a data volume to support the methods of distinguishing the new recording blocks from the old recording blocks.

These and other objects, features and advantages will be readily apparent upon consideration of the following detailed description in conjunction with the accompanying drawings.

BRIEF DESCRIPTION OF DRAWINGS

FIG. 1 is a partial view of a magnetic tape medium showing multiple recording block and a media information region;

FIG. 2 is a side view of a data volume comprising a tape medium on two spools and a non-volatile memory mounted inside a housing;

FIG. 4 is a partial view of a magnetic tape medium showing an old recording block situated in the middle of a new recording blocks written over the old recording blocks;

FIG. 6 is a partial view of a magnetic tape medium where the old recording blocks extend further along the tape than the new recording blocks;

FIG. 8 is a partial view of a magnetic tape medium in which the new recording blocks have been written over multiple write sessions.

BEST MODE FOR CARRYING OUT THE INVENTION

Figure 3:
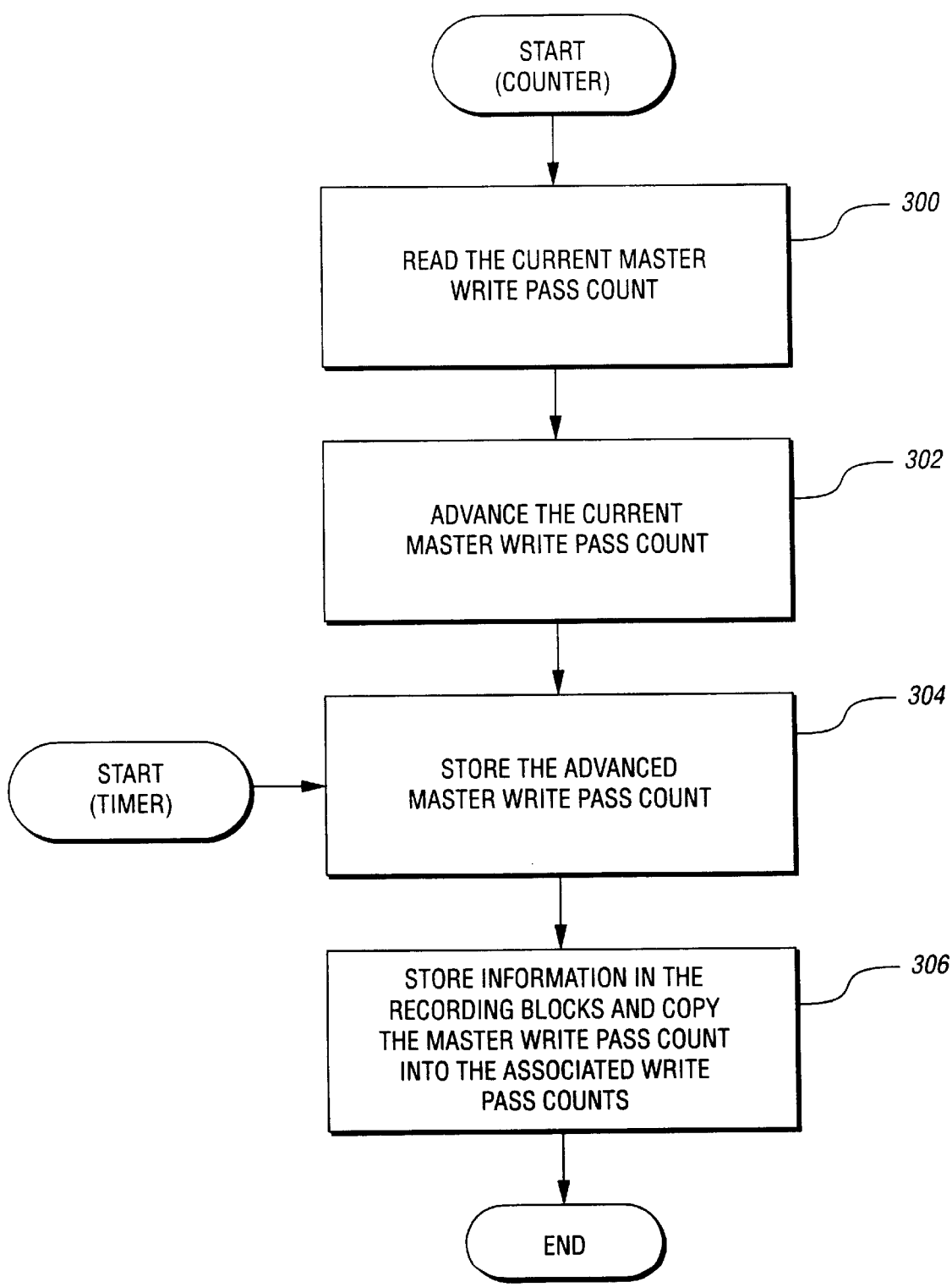
FIG. 3 is a flow diagram of a process for writing the Write Pass Counts in a medium along with the information.

The methods and mechanisms disclosed are applicable to all forms of media, and may extend to any housing that may accompany the media. In the discussion that follows, term "data volume" refers to the media at a minimum. Data volume includes a housing where appropriate for certain media (e.g., cartridge based tapes), and does not include the housing where the media (e.g., optical disks and real-to-real tapes) may be used standalone.

FIG. 1 shows the mechanism of present invention as implemented on a typical magnetic tape 100. A media information region 102 is stored at the physical beginning of the tape 100. Multiple recording blocks are arranged longitudinally along the length of the tape. Three recording blocks 104–108 are shown as representative of the multiple recording blocks. Each recording block 104–108 is divided into a header 110–114, information 116–120 and an optional trailer 122–126 respectively. The present invention adds an item called a Write Pass Count in each header of each recording block. FIG. 1 shows Write Pass Counts 128–132 in headers 110–114 respectively. A Master Write Pass Count 134 is added in the media information region 102.

Many variations on the configuration shown in FIG. 1 are possible within the scope of the present invention. For example, the Write Pass Counts 128–132 associated with recording block 104–108 may be added to the trailers 122–126 instead of the headers 110–114. In another example, the Write Pass Counts 128–132 may be added outside recording blocks 104–108 in the media information region 102 or other index region (not shown) and associated with the recording block through a pointer (not shown). In this situation, it is necessary that each Write Pass Count 128–132 is associated by some means with the proper recording block 104–108.

The Master Write Pass Count may also be stored in different places within the data volume. FIG. 2 show an example of a data volume 200 where the magnetic tape 100 is wound on spools 202 and 204. A housing 206 surrounds the magnetic tape 100 and spools 202 and 204. The Master Write Pass Count 134 (not shown in this figure) is stored in a nonvolatile memory 208. Nonvolatile memory 208 is mounted in housing 206 so that it can be externally accessed when the data volume 200 is mounted in a read/write drive (not shown). This is a practical approach when the media within the data volume 200 is a write-once-read-many (WORM) type of medium. To update the Master Write Pass Count in a WORM type media, each write of the Master Write Pass Count must be performed in a different position in the medium. Storing multiple copies of the Master Write Pass Count 134 can consume a modest amount of space over the life of the medium. By storing the Master Write Pass Count 134 in the nonvolatile memory 208, each time the Master Write Pass Count 134 is advanced, the new value can be written directly over the old value.

The Master Write Pass Count is information in any form that can be advanced without duplication over long periods of time. In the preferred embodiment, the Master Write Pass Count is an integer counter. This type of Master Write Pass Count is initialized to a value of zero when first created. Advancing is accomplished by incrementing. Since the Master Write Pass Count is never reset, it should have a sufficient maximum value to cover the maximum number of write cycles specified for the associated media. Counter rollover may take place where the Master Write Pass Count's maximum value is less than the media's maximum number of write cycles. While a rollover complicates the process of distinguishing new recording blocks from old recording blocks, it is not necessarily fatal to that process. Alternatively, the Master Write Pass Count may be initialized to a maximum value and then advanced by decrementing. Here, newer recording blocks have lower Write Pass Count values than older recording blocks. In yet another alternative, the Master Write Pass Count may be advanced by stepping through a pseudo-random sequence. The pseudo-random sequence must allow each Write Pass Count to be distinguished as advanced or not from any other Write Pass Count in the sequence.

In another embodiment, the Master Write Pass Count has a value of time. The time may be an absolute value identifying the year, month, day, hour, minute and second, or a relative offset from a predetermined epoch time. Advancing this type of Master Write Pass Count is accomplished by writing the current time. In the preferred embodiment, the Master Write Pass Count is advanced at the beginning of each new write session. This approach results in all of the Write Pass Counts in all of the recording blocks written to during one write session to have the same time value. Another approaches are to continuously update the Master Write Pass Count at each tick of the clock during a single write session, or any time that the data volume is mounted. These approaches will result in different Write Pass Counts in different recording blocks that are written in write sessions that are longer than one tick of the clock. A drawback to these last approaches is that they consume the write life cycle of the medium storing the Master Write Pass Count with unnecessary writes. Another drawback to using time for the Master Write Pass Count occurs when one data volume is written in different drives. If the clocks in the different drives are not in reasonable sync with each other, then it is possible for old information written on a first drive to have a more recent time than new information written on a second drive.

FIG. 3 is a flow diagram of a write session process that uses the Master Write Pass Count and the Write Pass Counts associated with the recording block being written. Where the Master Write Pass Count is a counter, the process starts by reading the current Master Write Pass Count from the data volume, as shown in block 300. The current Master Write Pass Count is then advanced by incrementing, block 302, and stored back into the data volume, as shown in block 304.

The information is then written into the recording blocks and the Master Write Pass count is copied into the Write Pass Counts associated with those recording blocks, as shown in block 306. Where the Write Pass Counts are stored in the recording block headers or recording block trailers, then the Write Pass Counts and information are written together. If the Write Pass Counts are stored outside the associated recording blocks, then they may be written before or after the information is written in the recording blocks. Where the Master Write Pass Count is a timer, the process starts at block 304 by storing the current time as the advanced Master Write Pass Count.

New information overwrites the old information already stored in a medium in a perfect write session. However, on occasion, the new information will fail to overwrite some of the old information. Old recording blocks intermixed with new recording blocks can cause problems during subsequent reads where each recording block is primarily identified using a unique block identification stored in the header or trailer. FIG. 4 shows an example where one old recording block 400 is situated in the middle of a sequence of new recording blocks 402–408. Here, recording block 400 and recording block 406 cannot be distinguished from each other because both have the same block identification (BLOCK ID) value of eighteen. By checking the Write Pass Count (WPC) values, recording block 406 has newer information than recording block 400 because the Write Pass Count of recording block 406 is higher (advanced) as compared with the Write Pass Count of recording block 400.

Figure 5:
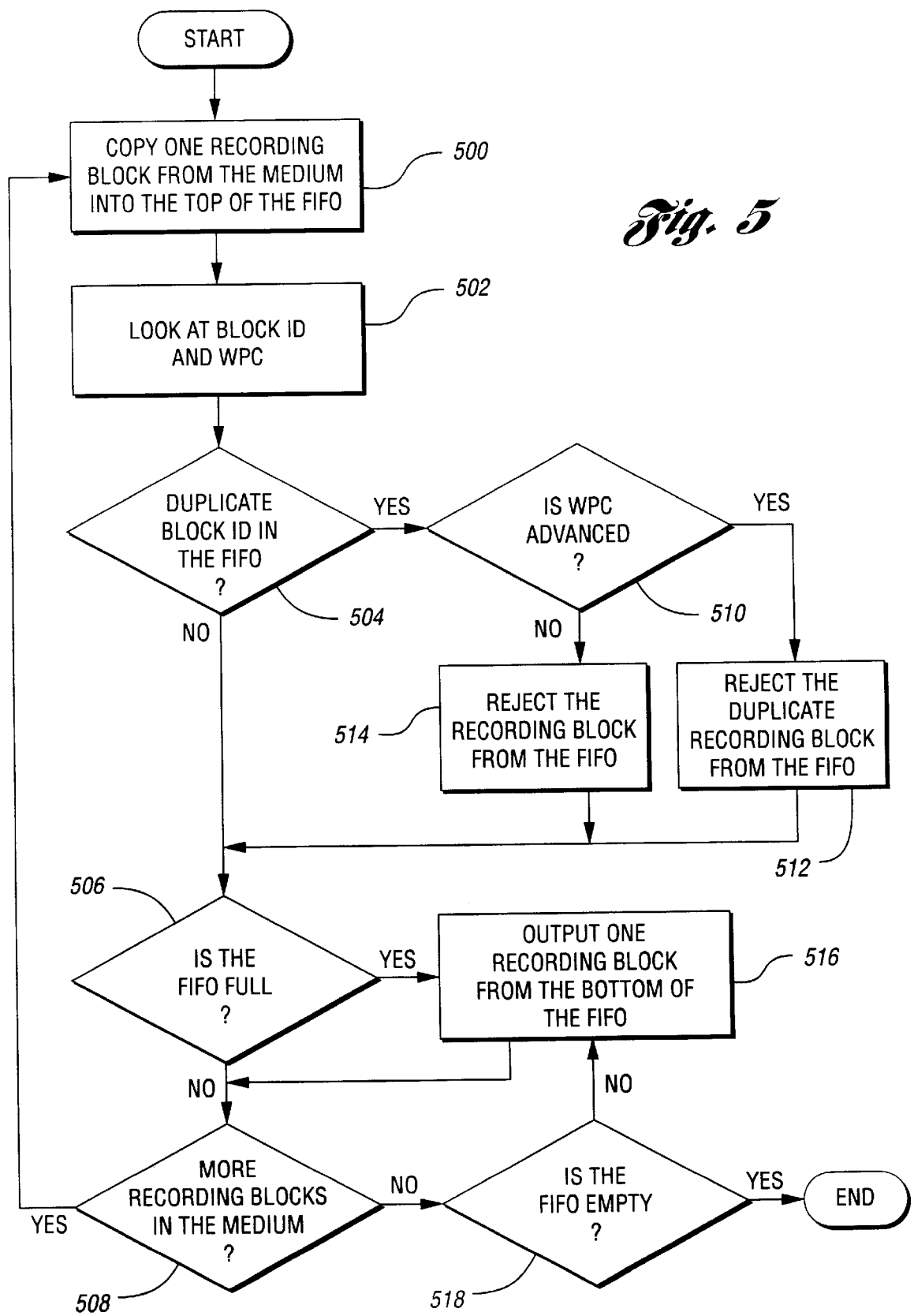
FIG. 5 is a flow diagram of a process that distinguishes new recording blocks from old recording blocks that have the same block identification.

FIG. 5 is a flow diagram of a read process that distinguishes new recording blocks from old recording block having the same block ID based upon the Write Pass Count. The process starts by reading one recording block at a time from the medium into the top of a First-In-First-Out (FIFO) buffer, as shown in block 500. The block ID of the recording block just read into the FIFO is then compared with the block ID's of all other recording blocks in the FIFO in search of a duplicate block ID, as shown by block 502. (Ideally, the FIFO buffer would be sufficiently large to buffer all of the recording blocks of information simultaneously. In practice, the FIFO buffer only needs to hold a subset of the recording block sufficiently large to establish a desired probability that duplicate recording blocks reside in the FIFO simultaneously.) If no duplicate recording blocks are found, and the FIFO is not full, the "NO" branches of decision blocks 504 and 506 respectively, then a check is made for more recording blocks in the medium at decision block 508. When a duplicate block ID is found, the Write Pass Count of the two recording blocks are compared, as shown by decision flow recording block 510. If the Write Pass Count of the recording block just copied into the top of the FIFO is advanced as compared with the duplicate recording block, then the duplicate recording block is removed from the FIFO, as shown in block 512. If the Write Pass Count of the recording block just copied into the top of the FIFO is not advanced as compared with the duplicate recording block, then the newly copied recording block is removed from the FIFO, as shown in block 514.

The cycle of copying recording blocks from the medium into the top of the FIFO continues until there are no more recording blocks, or the FIFO becomes full. When the FIFO becomes full the recording block at the bottom of the FIFO is output, as shown in block 516. If there are more recording blocks in the medium, then the process returns to block 500 where the next recording block is copied into the FIFO. Once all of the recording blocks have been copied from the medium into the FIFO, blocks 508, 516 and 518 output the recording blocks remaining in the FIFO.

The value of the Write Pass Count can be seen in the following example where new recording blocks are distinguished from old recording blocks using only the Write Pass Count. FIG. 6 shows an example where the new recording blocks are written over the old recording blocks, however, there are fewer new recording blocks than old recording blocks. Here, recording blocks 600–604 contain new information, a Write Pass Count of seventy-three, and have recording block ID's of ninety-eight, ninety-nine and one hundred respectively. Recording block 606 has a block ID of one hundred and one, and recording block 608 has a block ID of one hundred and two and thus they appear to be a continuation of the new information after recording block 604. However, recording blocks 606 and 608 contain old information written when the Master Write Pass Count (not shown) had a value of seventy-two. New recording blocks can be distinguished from old recording blocks comparing the Master Write Pass Count with the Write Pass Count associated with each recording block. Only those recording blocks having a Write Pass Count equal to the Master Write Pass Count were written during the latest write session.

Figure 7:
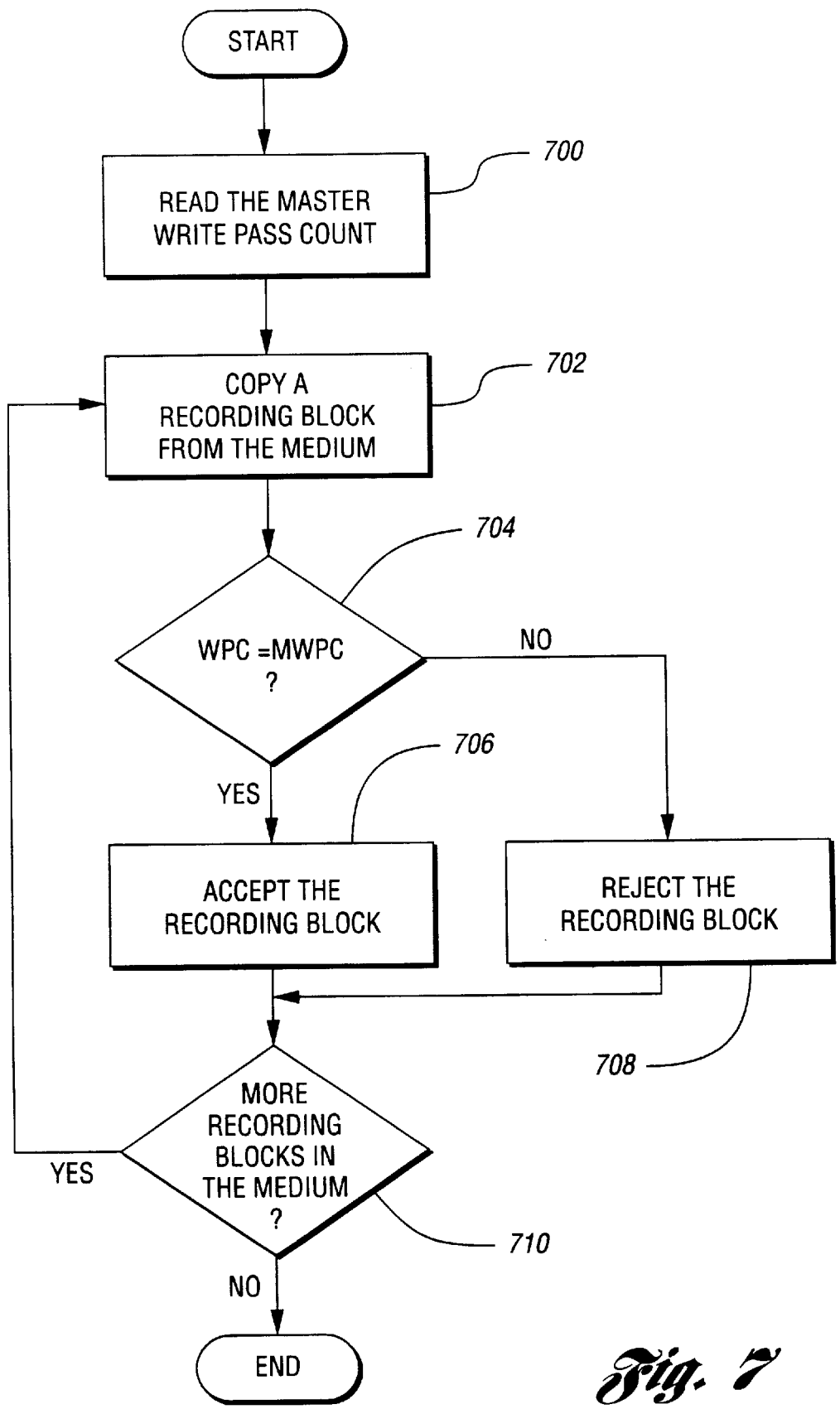
FIG. 7 is a flow diagram of a process that distinguishes new recording blocks from old recording blocks based only upon the Write Pass Counts.

FIG. 7 is a flow diagram of a process that distinguishes new recording blocks from old recording blocks based on the Write Pass Counts and Master Write Pass Count. The process starts by reading the current Master Write Pass Count, as shown in block 700. Next, one recording block of information is copied from the medium, as shown in block 702. The Write Pass Count of the recording block copied from the medium is then comparted with the current Master Write Pass Count (MWPC), as shown by decision block 704. If the Write Pass Count matches the Master Write Pass Count then the recording block of information is accepted, as shown in block 706, otherwise the recording block is rejected, as shown in block 708. Decision block 710 returns the process to block 702 to copy then next recording block from the medium until there are no more recording blocks. Referring to FIG. 4, note that this process will reject old recording block 400. The Write Pass Count of recording block 400 has a value of seven while the current Master Write Pass Count has a value of eight. Decision block 704 will result in a "NO" answer sending the process to block 708 where recording block 400 is rejected.

The present invention also accounts for situations where the information is written into a medium over the course of several write sessions. One of these situations occurs when a write of a single file into the medium is interrupted for some reason, and then continued later. Another of these situations occurs when a file already written into the medium is appended. Yet another of these situations occurs when multiple files are written into the medium at different times. In the preferred embodiment, each write session of the multiple write sessions is performed with a different Master Write Pass Count resulting in advancing Write Pass Counts when the recording blocks are viewed in the direction of increasing time. An alternate embodiment would be to leave the Master Write Pass Count at a constant value until all of the new information is stored. However, this alternate approach complicates the process of advancing the Master Write Pass Count.

FIG. 8 shows a simple example where the new recording blocks have several different Write Pass Counts. Recording blocks 800 and 802 were stored while the Master Write Pass Count (not shown) had a value of eight. Recording block 804 and 806 were stored while the Master Write Pass Count had a value of nine. Recording block 808 was stored while the Master Write Pass Count is at its current value of ten. Recording block 810 contains old information that was stored earlier in the medium when the Master Write Pass Count had a value of two. Recording block 810 ideally should have been overwritten by recording block 808 but for one reason or another was not.

Figure 9:
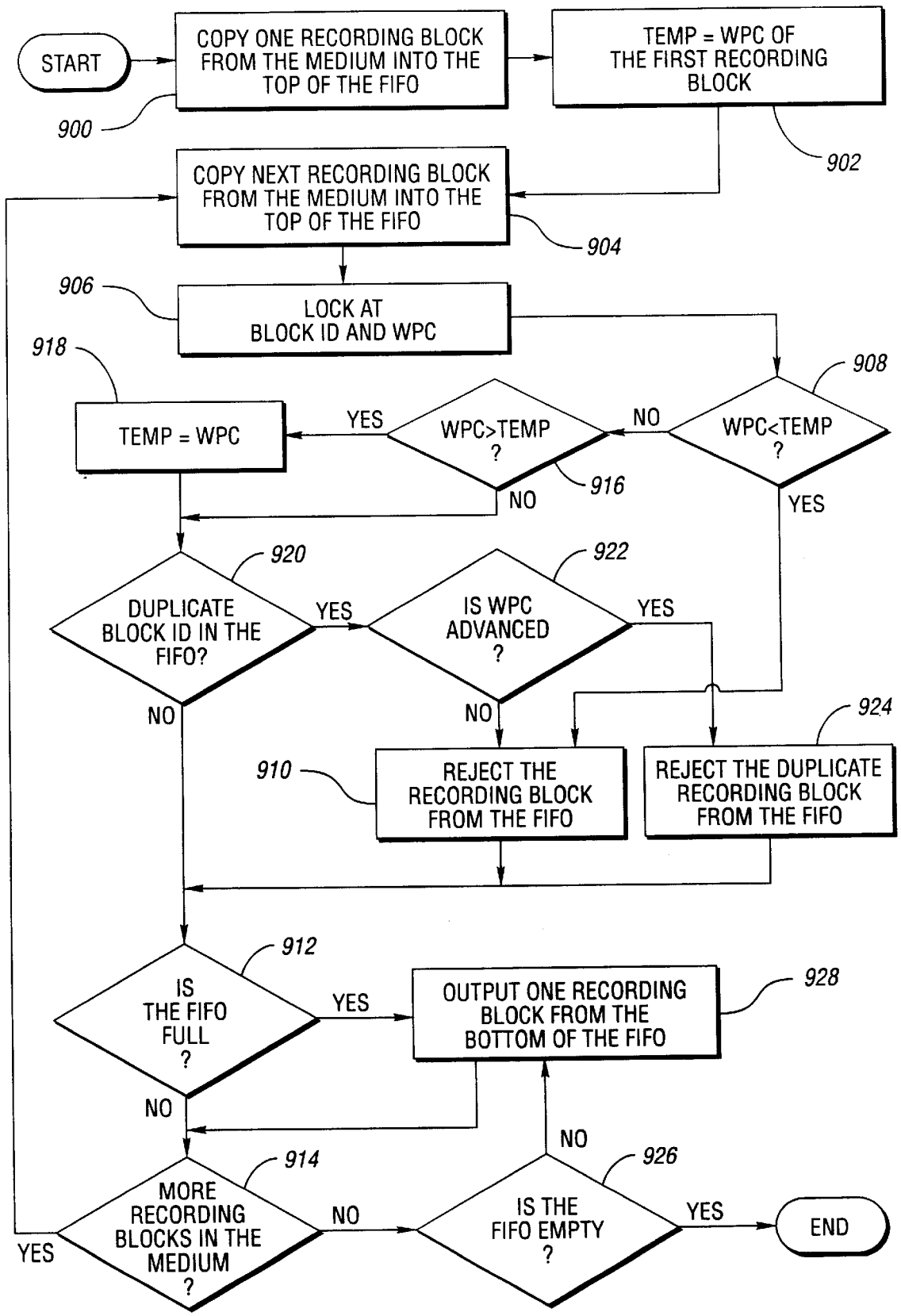
FIG. 9 is a flow diagram of a process that distinguishes new recording blocks from old recording blocks based upon advancing Write Pass Counts and block identifications.

FIG. 9 is a flow diagram of a process that distinguished recording block 810 from the other recording blocks 800–808 using the Write Pass Count as the primary criterion and the block ID as the second criterial. This process starts by copying the first recording block from the medium into a FIFO buffer, as shown in block 900. The Write Pass Count of the first recording block is then stored in a temporary variable (TEMP), block 902. A second recording block is then copied from the medium into the top of the FIFO, as shown in block 904. The Write Pass Count of the second recording block copied into the FIFO is then examined, as shown in block 906. If the Write Pass Count associated with the second recording block copied is less than the temporary value, the "YES" branch of decision block 908, then the second recording block is removed from the FIFO, as shown in block 910. When more room is available in the FIFO buffer and more recording blocks to be copied from the medium, then decision blocks 912 and 914 return the process to block 904 to copy the next recording block into the top of the FIFO.

When the Write Pass Count of the recording block just copied into the FIFO is greater than the temporary value, then the temporary value is set to that Write Pass Count, as shown in block 918. If the Write Pass Count is equal to the temporary value then block 918 is bypassed. At this point the block ID of the recording block at the top of the FIFO is checked against the block ID's of all other recording blocks in the FIFO. This check is necessary to account for the situation where the first one or more recording blocks copied from the medium contains old information. When this happens, the first recording blocks to contain new information will appear is the FIFO shortly afterwards. The "YES" branch of decision block 920 indicates that duplicate block ID's have been detected. Decision block 922 then distinguishes new recording blocks from old based upon their Write Pass Counts, and the old recording blocks are eliminated, as shown in blocks 924 and 910.

The cycle of copying recording blocks from the medium into the top of the FIFO continues until there are no more recording blocks, or the FIFO becomes full. When the FIFO becomes full the recording block at the bottom of the FIFO is output, as shown in block 928. If there are more recording blocks in the medium, then the flow returns to block 904 where the next recording block is copied into the FIFO. Once all of the recording blocks have been copied from the medium into the FIFO, decision blocks 926 and 914 and block 928 output the recording blocks remaining in the FIFO.

The present invention may be used with any type of media, in any format, and with any associated housing, if any. The preferred embodiment of the present invention is a magnetic tape in a removable cartridge type housing. Other types of suitable media include, but are not limited to optical, metallic films, dyepolymer films, bubble forming material, magneto-optical, amorphous to crystalline phase transition, and semiconductor media. Media write characteristics may allow for many write cycles, or just one write cycle on any given area. The media format may be in the shape of a tape, a disk, a card, an integrated circuit or other suitable formats known in the art. The housing, or the media itself, includes fixed and removable media applications.

In the preferred embodiment the recording blocks of information are arranged in a sequential nature in the media. Sequential includes linear, serpentine, and spiral paths. The idea is that the recording blocks appear at the read and write heads in order from the first recording block to the last recording block. The present invention can be used in applications where the recording blocks are scattered across the media at random. When using the distinguishing process shown in FIG. 7 that only uses the Write Pass Count, the order in which the recording blocks are evaluated is not important. When using other distinguishing processes where order is important, a buffer may be used to place the recording blocks in the necessary sequence.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of distinguishing old information from new information stored in a plurality of blocks in a medium, wherein a respective write pass count and a respective block identification are associated with each block of the plurality of blocks and a master write pass count is associated with the medium, the method comprising:

reading the master write pass count, the plurality of blocks, the respective write pass counts, and the respective block identifications;

comparing the respective write pass count and respective block identification of each block of the plurality of blocks with the respective write pass counts and the respective block identifications of a subset of blocks of the plurality of blocks in response to reading the subset of blocks of the plurality of blocks;

accepting each block of the plurality of blocks where the respective block identification does not duplicate the respective block identifications of the subset of blocks in response to comparing the respective write pass counts and the respective block identifications;

accepting each block of the plurality of blocks where the respective block identification duplicates the respective block identification of at least one other block of the subset of blocks, and where the respective write pass count is advanced as compared to the respective write pass count of the at least one other block of the subset of blocks in response to comparing the respective write pass counts and the respective block identifications;

rejecting the at least one other block of the subset of blocks in response to comparing the respective write pass counts and the respective block identifications; and rejecting each block of the plurality of blocks where the respective block identification duplicates the respective block identification of the at least one other block of the subset of blocks, and where the respective write pass count is not advanced as compared to the respective write pass count of the at least one other block of the subset of blocks in response to comparing the respective write pass counts and the respective block identifications.

2. The method of claim 1 further comprising:

remembering the respective write pass count of a first block of the plurality of blocks as a temporary write pass count in response to reading the respective write pass count of the first block;

comparing the respective write pass count of each block of the plurality of blocks with the temporary write pass count before comparing the respective write pass count and the respective block identification of each block of the plurality of blocks with the respective write pass counts and the respective block identifications of a subset of blocks of the plurality of blocks;

rejecting each block of the plurality of blocks where the respective write pass count is less than the temporary write pass count in response to comparing the respective write pass count to the temporary write pass count; and replacing the temporary write pass count with the respective write pass count of each block of the plurality of blocks compared where the respective write pass count is advanced as compared to the temporary write pass count in response to comparing the respective write pass count to the temporary write pass count.

* * * * *